3,029,228
**HYDROLYZED POLYMERS OF ALKYL METH-
ACRYLATES AND METHODS OF PRODUC-
ING THEM**
Frank J. Glavis, Elkins Park, Pa., assignor to Rohm &
Haas Company, Philadelphia, Pa., a corporation of
Delaware
No Drawing. Filed Oct. 15, 1957, Ser. No. 690,192
9 Claims. (Cl. 260—86.1)

The present invention relates to the production of novel, hydrolysis products of alkyl methacrylate polymers and to novel processes for producing them.

The prior art acknowledges the difficulty of hydrolyzing polymers of methyl methacrylate and other methacrylates. In order to accomplish such hydrolysis, extremely drastic conditions are generally required. Thus, United States Patent 2,504,049 discloses the hydrolysis of polymethyl methacrylate in benzene by the use of concentrated sulfuric acid. As pointed out in that patent, whereas polymeric esters of acrylic acid can be hydrolyzed in the presence of alkali with relative ease to polymeric acrylic acid, under such conditions the polymeric methacrylates are extremely stable to hydrolysis.

In accordance with the present invention, a polymer of an alkyl methacrylate, such as methyl methacrylate, is hydrolyzed by means of alkalies such as sodium hydroxide by carrying out the hydrolysis on a particulate form of the polymer in a medium which has a swelling action on the polymer, but in which the hydrolyzed product is neither soluble nor appreciably swollen. By carrying out the hydrolysis in this manner, it has been found possible to produce a particulate form of hydrolyzed polymer which is easily filtered and by simply drying can be converted to a free-flowing particulate mass which can be conveniently shipped or handled and which readily dissolves in aqueous media. The size of the polymeric alkyl methacrylate particles may vary widely in size. When the methacrylate polymer to be hydrolyzed is of low molecular weight such as from about 10,000 to 100,000, the particles may be from 1 micron up to 500 microns or more in average diameter. As the molecular weight rises, it is generally preferable to avoid excessive size in order to assure practical hydrolysis of each particle in the heterogeneous system. Hence, at molecular weights of about one to ten millions, the size is preferably from 1 to 100 microns, and intermediate sizes down to about 1 micron may be employed with polymers of intermediate molecular weight.

It has been found that a suitable medium in which the particulate polymer may be hydrolyzed consists of isopropanol or a mixture of isopropanol with ethylene glycol, a small amount of water being present. The isopropanol or mixture thereof with ethylene glycol apparently serves to swell the polymer particles without dissolving them. The amount of water may be from a trace up to one equivalent of water for each unit of the polymer to be hydrolyzed. It is essential that no more than one equivalent of water per unit to be hydrolyzed is employed since the use of additional water causes the medium in which the hydrolyzed particles are suspended to swell, and in extreme cases to dissolve, the hydrolyzed particles. The swelling of the hydrolyzed material results in the formation of gummy masses which interfere with any continued hydrolysis and also interfere with the subsequent use of the product. Similarly, if the hydrolyzed particles are dissolved, difficulties are encountered on drying so that a gummy mass is formed at some stage of the drying and an undesirable mass is produced.

Generally, isopropanol alone is suitable for the hydrolysis of homopolymers of the methacrylates such as methyl, ethyl, and butyl methacrylates. However, when copolymers of an alkyl methacrylate with other monomers such as ethyl acrylate, methyl acrylate, butyl acrylate, or other acrylates, acrylonitrile, methacrylonitrile, styrene, and vinyl acetate are to be hydrolyzed, it is frequently necessary to introduce a small proportion of ethylene glycol (or some other co-solvent) up to about 35% by weight of the isopropanol to provide a medium in which the starting copolymer does not dissolve.

Any alkali metal hydroxide may be employed to effect the hydrolysis such as sodium, potassium, or lithium hydroxides. The amount of hydroxide should be one equivalent for each unit of polymer to be hydrolyzed. Generally, the hydrolysis procedure in accordance with the present invention is capable of hydrolyzing up to 75 or 80% of the alkyl methacrylate units, the longer the time the greater proportion of hydrolysis that can be effected assuming adequate alkali metal hydroxide is present.

A convenient way of proceeding is to add the alkali metal hydroxide to the isopropanol or mixture thereof with ethylene glycol along with whatever small amount of water within the proportion specified hereinabove is pre-selected for the particular run. The medium may be then heated to dissolve the alkali metal hydroxide such as to a temperature of about 60° to 70° C. After cooling to 40° C., the particulate polymer of alkyl methacrylate is added with agitation. The medium is then heated, preferably to reflux, such as at about 80° to 85° C., and maintained at this temperature until the desired extent of hydrolysis is obtained. In general, the viscosity of the medium increases some during the first hour, but very shortly thereafter a non-viscous slurry containing the hydrolyzed polymer particles suspended therein forms. The slurry can be filtered at any time thereafter and the product obtained by drying is a free-flowing powder. Depending on the particular polymer, whether homopolymer or copolymer, that is used at the start, the extent of hydrolysis obtained at any given time may vary. Generally, a homopolymer of methyl methacrylate is 40% hydrolyzed within the first 16 to 24 hours at atmospheric pressure. By the time the non-viscous slurry initially forms (about 1½ to 2 hours), 15 to 17% of the methacrylate groups are generally hydrolyzed. At the end of about 48 hours 50% hydrolysis is generally completed and thereafter the rate becomes somewhat slower until about 75 to 80% of the methacrylate units are hydrolyzed.

The success of the hydrolysis in this sort of a medium is somewhat anomalous in that if an aqueous dispersion of a homopolymer of methyl or other alkyl methacrylate is produced by emulsion polymerization and sodium hydroxide is added, no hydrolysis is obtained even at elevated temperatures up to 100° C. However, if such an emulsion polymer is separated and introduced into isopropanol so that a very small amount of water is present and an alkali metal hydroxide is added, hydrolysis does occur at the elevated temperature given above. In general, hydrolysis by the procedure of the present invention may be effected at any temperature from about 60° C. upwards, such as to 120° C. or more. Generally, reflux temperatures are most suitably employed, and the higher temperatures can be obtained by the use of pressure. The temperature should not be so high as to cause appreciable degradation of the polymer.

The products obtained are free-flowing powders or granular materials which readily dissolve in aqueous media. Surprisingly, the products of hydrolysis have outstanding thickening efficiences for such media as polymer latices, well-drilling muds, cement slurries for cementing wells, and brackish waters or dilute saline solutions employed for the water-flooding procedures used for the recovery of oils from wells, the reference here made being directed especially to the viscous forward portions of the flooding liquids. The hydrolyzed polymers are also useful as a fluid-loss additive for hydraulic fracturing media, and in media introduced into wells for selective plugging of the more permeable portions of a formation. Surprisingly, for example a 20% hydrolyzed homopolymer of methyl methacrylate will produce far greater thickening than a copolymer of 20% of methacrylic acid with 80% of methyl methacrylate obtained by direct copolymerization of the two monomers and then by neutralization to the corresponding salt. The copolymers obtained by direct polymerization frequently are not even soluble in the saline waters desired to be thickened. This surprising solubility and thickening capacity of the hydrolyzed polymers of methyl methacrylate in the form of their alkali metal salts, as compared to those of corresponding analytical composition obtained by direct polymerization, is believed attributable to the fact that in hydrolysis the most readily available units of the polymer are affected, whereas in copolymerization the acid units are as likely as not to be introduced into the copolymer in a configuration such that they are relatively unavailable because of steric hinderances for subsequent solvation in water.

The hydrolytic process of the present invention is useful for hydrolyzing all types of lower alkyl methacrylate polymers including those obtained from methacrylates of alcohols having from 1 to 4 carbon atoms, whether such polymers are in the non-crystallizable type or of the crystallizable types. It has been found that the hydrolysis occurs at different rates in the different types of crystallizable polymers. The hydrolytic procedure may be employed as an analytical tool to detect or distinguish between the normal non-crystallizable polymers, the isotatic crystallizable polymers, and the syndiotactic crystallizable polymers.

If desired, a polymer of the alkyl methacrylate alone or with other comonomers may be made by polymerization thereof in the same medium as that in which hydrolysis is to be effected or in isopropanol alone or in a mixture of isopropanol with ethylene glycol. In such cases the hydrolysis may be effected at any time after completion of polymerization, the alkali metal hydroxide being added with or without additional water within the limits prescribed hereinabove.

When the polymer of the lower alkyl methacrylate, such as methyl methacrylate, contains units of other hydrolyzable groups including units of acrylonitrile, units of methacrylonitrile, units of esters of vinyl alcohol such as vinyl acetate, and acrylic acid ester units, the hydrolytic procedure of the present invention will hydrolyze such other units as well; and, consequently, the amount of water that may be present is not dependent solely upon the equivalent weight of methacrylate units, but also upon the total equivalent weight of hydrolyzable units including those mentioned hereinabove. Likewise, the extent of hydrolysis can be controlled by limiting or adjusting the proportion of alkali metal hydroxide since hydrolysis does not proceed after the hydroxide is consumed in the production of the alkali metal salt of the acid hydrolytic products obtained.

The products obtained in accordance with the present invention in which about 15 to about 75% of the methacrylate units are hydrolyzed are usable in all of the situations where analogous polymer salts have been used heretofore such as in thickening aqueous dispersions including pigment pastes used for printing on paper and for the printing and pigment-dyeing of textiles; for thickening other compositions to be applied to textiles such as warp sizes, permanent sizes, backings, especially for rugs and other pile fabrics; for the thickening of aqueous, natural, or synthetic polymer latices; for the thickening of water and especially saline waters to be used in the recovery of oil from exhausted oil wells by the water-flooding technique; in cosmetic creams and pastes, and so on.

The alkali metal salts obtained by the hydrolysis procedures of the present invention may be converted into the free acid form of the copolymers by acidifying aqueous solutions of the copolymers salts in which case the acid copolymer falls out of solution and may be recovered. The acid copolymer may be converted to other salts such as the salts of water-soluble amines such as diethylamine, monoethylamine, triethylamine, morpholine, piperidine, triethanolamine, diethanolamine, monoethanolamine, and so on. Such amine salts are water-soluble and may also be used as aqueous thickening agents. If desired, the acid copolymer may be converted to insoluble salts of polyvalent metals such as calcium, magnesium, zinc, aluminum, barium, and so on.

The following examples are illustrative of the invention, and the parts and percentages therein are by weight unless otherwise indicated.

*Example 1*

Methyl methacrylate (MMA) was polymerized by a redox initiator system at 30% solids in water. To 70 parts of water was added 30 parts of MMA, 0.015 part of sodium octylphenoxydiethoxyethyl sulfate, and, after de-aeration with nitrogen, 0.03 part of ammonium persulfate and 0.015 part of sodium hydrosulfite. With continued de-aeration, the reaction was allowed to proceed, the batch temperature rising from 25° C. to 65° C. in about two hours. This particular batch was then precipitated by adding small quantities of alum, and the precipitate removed by filtration, washed several times with water, and dried in an oven at 60° C.

For the hydrolysis, 90 parts of isopropanol (dry) was introduced into a reaction vessel and then there was added 4.0 grams of NaOH and a total of 1.8 parts of water and the mixture heated to 80° C. to obtain complete solution of the caustic. The mixture was then cooled to 40° C. and 10 parts of the dry MMA homopolymer was added to the agitated isopropanol solution. The suspension was then re-heated to 80° to 85° C. and held at this point for 24 hours. After about the first hour, the dispersion had thickened appreciably. A fine white powder was separating from the thickened slurry by the end of the second hour. During the remainder of the time, the suspension was a thin, readily-stirred dispersion. After 24 hours, the suspension was cooled and filtered. The powder so obtained was dried at 60° C. to produce a free-flowing, readily water-soluble product.

In order to check the effect of thickening action upon degree of hydrolysis, samples were also removed from the hydrolysis batch after the first 8 hours and after the first 14 hours of heating. Degree of hydrolysis (percent of methacrylate units hydrolyzed) is calculated from an electrometric titration curve, the acid portion of the polymer depending upon the difference between the two inflection points of the curve (representing free alkalinity and —COONa groups respectively). The table below lists thickening data for the various fractions, such thickening being obtained in water and in aqueous brines.

| Time, Hrs. | Degree of Hydrolysis, Percent | Viscosity (Centistokes at 100° F.) | | | | |
|---|---|---|---|---|---|---|
| | | In Water | | | In Brine | |
| | | 0.1% | 0.5% | 1% | 0.5% in 0.5% NaCl | 0.1% in 0.1% NaCl |
| 8 | 5–10 | Insoluble in water | | | | |
| 14 | 30 | 6.5 | 16.9 | 40.0 | 6.2 | 3.4 |
| 24 | 42 | 2.9 | 7.7 | 14.6 | 3.7 | 1.7 |

*Example 2*

An MMA homopolymer was prepared exactly as in the case of Example 1, except that 0.06 gram of sodium octylphenoxydiethoxyethyl sulfate, 0.05 gram of ammonium persulfate, and 0.025 gram of sodium hydrosulfite were used. The hydrolysis was carried out in the same way except that the entire charge was heated for 24 hours. The polymer was hydrolyzed to an extent of 41%. A 5.0% solution of this polymer in water has a viscosity of 1,000 cps., spindle 3, 12 r.p.m. on the Brookfield viscometer. Thickening of simple and compounded GRS latices (butadiene-styrene) is listed below, in each case the percent of thickener being expressed as percent of the hydrolyzed MMA polymer based on the amount of rubber solids in the latex. The compounded latex comprises a mixture of (a) 10,860 parts of the GRS latex containing 20% solids, (b) 440 parts of an aqueous solution containing 44 parts of a t-octylphenoxypolyethoxyethanol, and (c) 8,050 parts of an aqueous suspension containing 55% of Buca clay. Comparative figures for thickening by a hydrolyzed polyacrylonitrile are included.

| Latex | Thickener, Percent | Heterohydrolyzed Polymer, cps. | Hydrolyzed Polyacrylonitrile, cps. |
| --- | --- | --- | --- |
| GRS latex (40% solids) | 1.0 | 18,000 | 2,000 |
|  | 0.5 | 1,000 | 100 |
|  | 0.25 | 200 |  |
| Compounded latex | 4.0 | 15,000 | 1,000 |
|  | 2.0 | 5,500 |  |
|  | 1.0 | 1,500 |  |

*Example 3*

The same redox technique as that of Example 1 was used for preparing a copolymer of ethyl acrylate (EA) with methyl methacrylate with the following exceptions. The monomer mixture was EA:MMA, 1:1 weight ratio. A more concentrated emulsion was prepared by adding the monomer in three portions, such that the final solids content was 55%. For each incremental monomer addition, 0.5% ammonium persulfate and 0.25% sodium hydrosulfite was used, and 3.0% of sodium octylphenoxydiethoxyethyl sulfate (based on the initial monomer charge) was used as the emulsifying agent. The heterohydrolysis was carried out as in Example 1 for 24 hours, and a degree of hydrolysis of 35% (of MMA units) was obtained. Viscosities were measured in water and in brine as follows:

| Polymer, Percent | Centistokes at 100° F. | | |
| --- | --- | --- | --- |
|  | Water | 0.5% NaCl | 0.1% NaCl |
| 1.0 | 224 |  |  |
| 0.5 | 88 | 13 |  |
| 0.1 | 3.0 |  | 3.4 |

*Example 4*

A copolymer of methyl methacrylate (MMA) with acrylonitrile (AN) in a 1:1 weight ratio was prepared by the redox polymerization method of Example 1, with 1.0% of sodium octylphenoxydiethoxyethanol sulfate as emulsifier, and 0.1% of ammonium persulfate and 0.05% of sodium hydrosulfite as the initiator system. The solid polymer was isolated by freeze-drying the resultant emulsion. The heterohydrolysis was carried out with 10 parts of this copolymer, 90 parts of dry isopropanol, 5.0 parts of NaOH, and 2.7 parts of water. Hydrolysis was carried out for 24 hours, and a degree of hydrolysis of 34% (of MMA units) was obtained. Viscosities were obtained in water and in brine solutions, as follows:

| Polymer, percent | Centistokes at 100° F. | |
| --- | --- | --- |
|  | Water | 0.25— NaCl |
| 1.0 | 100,000 |  |
| 0.5 | 3,260 |  |
| 0.25 | 576 | 8.0 |

*Example 5*

Homopolymers of ethyl methacrylate and n-butyl methacrylate prepared as described in Example 1 are hydrolyzed by the general procedure of Example 1 to the extent of about 25%.

*Example 6*

Ethyl acrylate and methyl methacrylate were mixed in a 1:1 weight (molar) ratio. To 800 parts of water, containing 1.0 part of ammonium persulfate and maintained at 90° to 98° C., was added 200 parts of the monomer mixture over a period of about one hour. Heating was continued for one-half hour following the completion of the addition of the monomer mixture in order to assure complete polymerization, and the polymer suspension was freeze-dried. The fine solid thus obtained was hydrolyzed by placing 100 parts of the powder in 900 parts of a mixture in a 3:1 weight ratio of isopropanol and ethylene glycol, the solvent blend containing 20 parts of NaOH (1.0 equivalent of caustic for each equivalent of ethyl acrylate in the polymer) and 18 parts of water. Hydrolysis was carried out by heating the batch at 78° to 80° C. for three and one-half hours, followed by cooling to room temperature, filtration, and washing with small portions of isopropanol. The product was readily soluble in warm water, a 1.7% aqueous solution having an observed viscosity (Brookfield viscometer) of over 100,000 cps. Thickening of both simple and compounded GRS latex as above was accomplished by direct addition of the fine powder to the latex and addition of enough water to provide that amount which would have been added had the polymer been added as a 5.0% aqueous solution, a normal practice which could not be followed in this particular case because of the extreme viscosity of a 5.0% aqueous concentrate of this polymer. At the 1.0% level in GRS latex, a viscosity of 5500 cps. was obtained. At the 1.5% level in compounded GRS latex, a viscosity of 6000 cps. was obtained. At the corresponding level in compounded GRS latex, a commercially-available hydrolyzed acrylonitrile polymer thickens only to a value of 100 to 200 cps. No data are available on dilute concentration viscosities in water and in brine for this polymer.

*Example 7*

A polymer was prepared by the method of Example 1, and the homopolymer of MMA was isolated by spray-drying. This polymer was mixed with nine times its weight of isopropanol, and with 1.0 equivalent of water and 1.0 equivalent of NaOH per 1.0 equivalent of polymer. Hydrolyses were then run at the different temperatures noted below. The run at 125° C. was made by placing the reaction mixture in the glass-liner of a stainless steel shaker bomb and heating to the desired temperature. Data are reproduced below.

| Temperature, ° C. | Time, Hrs. | Degree of Hydrolysis, percent | Remarks |
| --- | --- | --- | --- |
| 60 | 144 | 10 | Slightly soluable in H₂O. |
| 80 | 1.5 | 5 | Insoluble in water. |
| 80 | 24 | 35 | Soluble in water. |
| 125 | 1.5 | 18 | Do. |

*Example 8*

Two crystalline homopolymers of MMA were hydrolyzed with NaOH in isopropanol as in the preceding example, with the hydrolysis temperature maintained at 80° C. for 1.5 hours. After cooling, the hydrolyzed polymers were removed by filtration and analyzed by the usual methods. It is significant to note that the viscosity of the aqueous solutions of the hydrolysates indicate that there has been little, if any, polymer degradation during the heterohydrolysis.

| Molecular Weight | Degree of Hydrolysis, percent | Visc. of 1.0% Aqueous Soln. of Hydrolysate, cps. |
| --- | --- | --- |
| 100,000 | 49 | 2.4 |
| 1,250,000 | 49 | 15.8 |

I claim:

1. A process for hydrolyzing an alkyl methacrylate polymer to form an alkali metal salt of a methacrylic acid polymer which comprises heating, at a temperature of at least 60° C. but below a temperature at which appreciable polymer degradation occurs, a particulate polymer of an alkyl methacrylate in which the alkyl group has 1 to 4 carbon atoms, selected from the group consisting of homopolymers thereof and copolymers containing in the polymer molecule 50 to 100% by weight of at least one of the aforesaid alkyl methacrylates and up to 50% by weight of other copolymerizable monoethylenically unsaturated molecules, suspended in a liquid medium which swells the polymer without dissolving it but does not appreciably swell and does not dissolve an alkali metal salt of hydrolysis products of the polymer having at least 10% of hydrolyzed methacrylate units, said medium containing an organic solvent selected from the group consisting of isopropanol and mixtures of isopropanol and ethylene glycol, sufficient ethylene glycol being used when the first-mentioned particulate polymer is soluble in isopropanol to prevent the medium from dissolving said polymer, an alkali metal hydroxide, and a small amount of water up to but not in excess of 1 mole thereof per hydrolyzable unit of the polymer.

2. A process as defined in claim 1 in which the copolymer comprises units of at least one comonomer selected from the group consisting of acrylonitrile, methacrylonitrile, vinyl acetate, acrylic acid esters, and methacrylic acid esters.

3. A process for hydrolyzing a methyl methacrylate polymer to form an alkali metal salt of a methacrylic acid polymer which comprises heating, at a temperature of at least 60° C. but below a temperature at which appreciable polymer degradation occurs, a particulate homopolymer of methyl methacrylate suspended in swollen but undissolved condition in isopropanol containing an alkali metal hydroxide, and a small amount of water up to but not in excess of 1 mole thereof per unit of the polymer.

4. A process for hydrolyzing an alkyl methacrylate copolymer to form an alkali metal salt of a methacrylic acid copolymer which comprises heating, at a temperature between 60° C. and 120° C., a particulate copolymer of at least 50% by weight of methyl methacrylate with up to 50% by weight of an ester of acrylic acid suspended in swollen but undissolved condition in a mixture of isopropanol and ethylene glycol, the latter being present in an amount up to about ⅓ the weight of isopropanol and providing a mixture which does not dissolve the copolymer and does not dissolve and does not appreciably swell an alkali metal salt of hydrolysis products of the copolymer having at least 10% of hydrolyzed methacrylate units, said mixture containing an alkali metal hydroxide and a small amount of water up to but not in excess of 1 mole thereof per hydrolyzable unit of the polymer.

5. A process as defined in claim 4 in which the copolymer contains ethyl acrylate units.

6. A process for hydrolyzing a methyl methacrylate copolymer to form an alkali metal salt of a methacrylic acid copolymer which comprises heating, at a temperature between 60° C. and 120° C., a particulate copolymer of at least 50% by weight of methyl methacrylate and up to 50% by weight of acrylonitrile suspended in swollen but undissolved condition in isopropanol containing an alkali metal hydroxide, and a small amount of water up to but not in excess of 1 mole thereof per hydrolyzable unit of the polymer.

7. A process for hydrolyzing a methyl methacrylate copolymer to form an alkali metal salt of a methacrylic acid copolymer which comprises heating, at a temperature between 60° C. and 120° C., a particulate copolymer of at least 50% by weight of methyl methacrylate and up to 50% by weight of ethyl acrylate suspended in swollen but undissolved condition in isopropanol containing an alkali metal hydroxide, and a small amount of water up to but not in excess of 1 mole thereof per hydrolyzable unit of the polymer selected from the group consisting of acrylonitrile units, methacrylonitrile units, vinyl alcohol ester units, acrylic acid ester units, and methacrylic acid ester units.

8. A process for hydrolyzing an alkyl methacrylate polymer to form an alkali metal salt of a methacrylic acid polymer which comprises heating, at a temperature between 60° C. and 120° C. for a period of at least one and one-half hours a particulate polymer of an alkyl methacrylate in which the alkyl group has 1 to 4 carbon atoms, selected from the group consisting of homopolymers thereof and copolymers containing in the polymer molecule 50 to 100% by weight of at least one of the aforesaid alkyl methacrylates and up to 50% by weight of other copolymerizable monoethylenically unsaturated molecules, suspended in a liquid medium which swells the polymer without dissolving it but does not appreciably swell and does not dissolve an alkali metal salt of hydrolysis products of the polymer having at least 10% of hydrolyzed methacrylate units, said medium containing an organic solvent selected from the group consisting of isopropanol and mixtures of isopropanol and ethylene glycol, sufficient ethylene glycol being used when the first-mentioned particulate polymer is soluble in isopropanol to prevent the medium from dissolving said polymer, an alkali metal hydroxide, and a small amount of water up to but not in excess of 1 mole thereof per hydrolyzable unit of the polymer, separating the hydrolyzed product from the hydrolysis medium by filtration, and drying the separated product.

9. A process for hydrolyzing a methyl methacrylate polymer to form an alkali metal salt of a methacrylic acid polymer which comprises heating, at a temperature between 60° C. and 120° C. a particulate homopolymer of methyl methacrylate suspended in swollen but undissolved condition in isopropanol containing an alkali metal hydroxide, and a small amount of water up to but not in excess of 1 mole thereof per unit of the polymer.

References Cited in the file of this patent

UNITED STATES PATENTS

| | | |
| --- | --- | --- |
| 2,265,937 | Dittmar | Dec. 9, 1941 |
| 2,328,922 | Neher et al. | Sept. 7, 1943 |
| 2,399,653 | Roland | May 7, 1946 |
| 2,504,049 | Richards | Apr. 11, 1950 |
| 2,538,273 | Rhines | Jan. 16, 1951 |
| 2,861,059 | Mowry et al. | Nov. 18, 1958 |
| 2,897,172 | Maeder | July 28, 1959 |